United States Patent
van der Laak et al.

(10) Patent No.: US 9,451,407 B2
(45) Date of Patent: Sep. 20, 2016

(54) SEEK AND FIND LOCATION METHOD, SYSTEM AND APPARATUS

(71) Applicant: Seek and Find AS, Snaroya (NO)

(72) Inventors: Frode van der Laak, Snaroya (NO); Erik Julo, Snaroya (NO); Bente Julo, Snaroya (NO); Marlene Julo, Snaroya (NO)

(73) Assignee: Seek and Find AS, Snaroya (NO)

( * ) Notice: Subject to any disclaimer, the term of this patent is extended or adjusted under 35 U.S.C. 154(b) by 0 days.

(21) Appl. No.: 14/748,055

(22) Filed: Jun. 23, 2015

(65) Prior Publication Data

US 2015/0373496 A1 Dec. 24, 2015

Related U.S. Application Data

(63) Continuation of application No. 14/205,120, filed on Mar. 11, 2014, now abandoned, which is a continuation of application No. 13/065,337, filed on Mar. 18, 2011, now abandoned.

(60) Provisional application No. 61/315,803, filed on Mar. 19, 2010.

(51) Int. Cl.
*H04B 15/00* (2006.01)
*H04W 4/02* (2009.01)
(Continued)

(52) U.S. Cl.
CPC ............ *H04W 4/025* (2013.01); *G01S 19/16* (2013.01); *H04W 4/02* (2013.01); *G08B 21/0269* (2013.01); *H04W 8/24* (2013.01); *H04W 64/00* (2013.01)

(58) Field of Classification Search
CPC ..................................... G01S 19/16
USPC ...................... 455/420, 456.2, 517
See application file for complete search history.

(56) References Cited

U.S. PATENT DOCUMENTS 5,167,626 A 12/1992 Casper et al.
5,576,716 A 11/1996 Sadler
(Continued)

FOREIGN PATENT DOCUMENTS

JP 2002087185 A 3/2002
JP 2002104137 A 4/2002
(Continued)

OTHER PUBLICATIONS

Hyeon Hong Lee, Korean Intellectual Property Office, International Search Report and Written Opinion for International Patent Application No. PCT/US2011/029063, completed on Oct. 31, 2011, mailed on Nov. 1, 2011.

*Primary Examiner* — Hsin-Chun Liao
(74) *Attorney, Agent, or Firm* — Ellen M. Bierman; Lowe Graham Jones PLLC

(57) ABSTRACT

Methods, systems, and apparatus for locating the seek and find RF device are provided. An exemplary embodiment of a seek and find RF device receives a first RF cell phone signal from a requesting party device, wherein the first RF cell phone signal includes at least a location query requesting location information of the seek and find RF device, and wherein the location query is directed to the seek and find RF device using a mobile device identifier. The seek and find RF device receives at least three GPS satellite signals and determines a location of the seek and find RF device based upon the at least three GPS satellite signals. The seek and find RF device then transmits a second RF cell phone signal, wherein the second RF cell phone signal includes the determined location, and wherein the second RF cell phone signal is directed to the requesting party device using a device identifier.

19 Claims, 4 Drawing Sheets

(51) Int. Cl.
*G01S 19/16* (2010.01)
*G08B 21/02* (2006.01)
*H04W 8/24* (2009.01)
*H04W 64/00* (2009.01)

(56) References Cited

U.S. PATENT DOCUMENTS

| | | |
|---|---|---|
| 2005/0156715 A1 | 7/2005 | Zou et al. |
| 2007/0032225 A1 | 2/2007 | Konicek et al. |
| 2008/0055154 A1 | 3/2008 | Martucci et al. |
| 2008/0186163 A1 | 8/2008 | Mills |
| 2011/0077025 A1 | 3/2011 | Kudo |
| 2012/0154211 A1 | 6/2012 | Berajas Endez |

FOREIGN PATENT DOCUMENTS

| | | |
|---|---|---|
| JP | 2003281651 A | 10/2003 |
| JP | 2005346647 A | 12/2005 |
| WO | 9949331 | 9/1999 |
| WO | 0050915 | 8/2000 |
| WO | 0173466 A1 | 10/2001 |
| WO | 2008150412 A1 | 12/2008 |

…

SEEK AND FIND LOCATION METHOD, SYSTEM AND APPARATUS

TECHNICAL FIELD

The present disclosure relates to methods, systems, and apparatus for device location discovery and, in particular, to methods, systems, and apparatus for identifying an accurate GPS derived location of a seek and find enabled device using wireless communications.

BACKGROUND

Accurate determination of a precise location of an electronic device from a remote location is very difficult. As an example, location of a cell phone or other radio frequency (RF) device can be approximated by triangulation methods based upon a plurality of cell sites that are currently detecting signals from the cell phone. However, the location derived for the cell phone is, at best, only accurate within several hundred meters or more.

As another example, systems are available to determine location of a lost or stolen vehicle. The requesting party, such as an owner of the car, submits a telephone inquiry or the like to a receiving station operated by a service provider. There, an operator or the like at the service provider's receiving station contacts an electronic location device residing in the vehicle. The vehicle electronic location device replies with location information. The operator then can inform the requesting party of the precise location of the vehicle.

However, the requesting party must submit a location query to the service provider. Submitting the location query through a third party service provider introduces an undesirable delay time, and is an inconvenience to the requesting party. Further, the requesting party must make the request using devices and protocol specified by the service provider.

BRIEF DESCRIPTION OF THE DRAWINGS

This description can be better understood with reference to the following drawings. The components in the drawings are not necessarily to scale, emphasis instead being placed upon clearly illustrating the principles of the present description. Moreover, in the drawings, like reference numerals designate corresponding parts throughout the several views.

DETAILED DESCRIPTION

Figure 1:
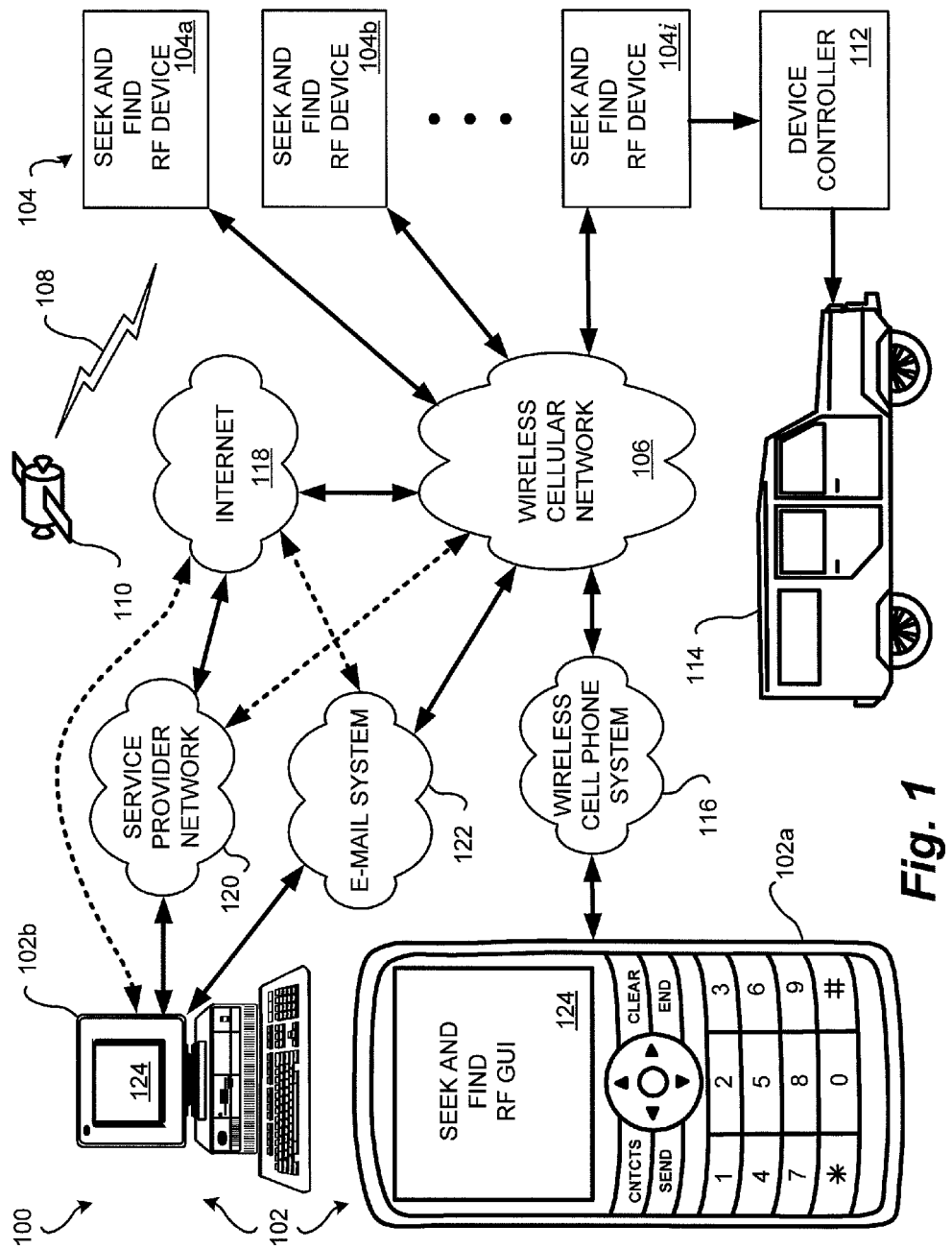
FIG. 1 is an exemplary block diagram illustrating a seek and find system that employs a plurality of requesting party devices and a plurality of seek and find RF devices.

Embodiments described herein provide methods, systems, and techniques for discovering location of a seek and find radio frequency (RF) device. FIG. 1 is an exemplary block diagram illustrating a seek and find system 100 that employs a plurality of requesting party devices 102a-102b (generally, device 102) and a plurality of seek and find RF devices 104a-104i (generally, device 104).

A location query requesting the location of the seek and find RF device is sent from one of the requesting party devices 102. Non-limiting examples of requesting party devices include a cell phone 102a. Other examples of mobile requesting party devices 102 include, but are not limited to, personal device assistants, I-phones, Blackberries, notebooks, and laptop computers. Further, the requesting party device 102 may not be mobile, such as, but not limited to, an exemplary personal computer (PC) 102b.

At some point in communication of a message with the location query therein, the message with the location query is transmitted in a RF cell phone signal, via a wireless cellular network 106, to a designated seek and find RF device 104. The designated seek and find RF device 104 is identified by its unique identifier, such as its cell phone number or the like. Thus, the designated seek and find RF device 104 receives a wireless RF cell phone signal having the location query.

In response to receiving the RF cell phone signal with the location query, the designated seek and find RF device 104 replies with information specifying its precise location. The highly precise location is determined from detected global positioning system (GPS) signals 108 transmitted from a plurality of GPS satellites 110. It is appreciated that at least three different GPS satellites 110 must be detected for accurate location determination. However, detection of additional GPS satellites 110 allows for increased accuracy in the determined location. Further, other devices may supplement determination of device location, such as, but not limited to, altimeters, compasses, accelerometers, and/or gyroscopes.

In some embodiments, the requesting party device 102 can communicate a device command instruction to the seek and find RF device 104, wherein the seek and find RF device 104 communicates the device command instruction to a device controller 112 which executes the function in accordance with the device command instruction. As a non-limiting example, the police or owner of an automobile 114 or other vehicle may initiate a location query from their requesting party device 102. The location query causes the seek and find RF device 104i that is located in the automobile 114 to reply with its current location information. If the police or the owner of the automobile 114 wish to have the automobile 114 become wholly or partially disabled, then a shut-down command, slow-down command, or the like can be sent to the seek and find RF device 104i. Accordingly, the automobile 114 is shut off or its speed is limited. Then, the automobile 114 can be retrieved by the police or the owner.

Various types of requesting party devices 102 may be configured to generate and communicate location query messages to a designated seek and find RF device 104. To illustrate, the exemplary mobile device 102a is in communication with a wireless cell phone system 116. The user of the mobile device 102a may wish to receive information regarding the location of a designated seek and find RF device 104 using the mobile device identifier of the designated seek and find RF device 104. Thus, the mobile device 102a communicates an RF message with a location query onto the wireless cell phone system 116. Eventually, the message is communicated to the designated seek and find RF device 104 from the wireless cell phone network 106. The manner in which the message from the mobile device 102a is routed to the designated seek and find RF device 104 occurs using well known cellular technologies. That is, the message from the mobile device 102a to the seek and find RF device 104 is routed just like any other phone call from the mobile device 102a to another mobile cellular-based device. It is appreciated that in some situations, the wireless cell phone network 106 and the wireless cell phone system 116 may be the same wireless cell phone system.

The reply message with the location information therein is transmitted from the designated seek and find RF device 104 onto the wireless cell phone network 106. The reply message is routed back to the mobile device 102a, and is delivered via the wireless cell phone system 116. The receiving mobile device 102a can then extract the location information and present such information to the person at the mobile device 102a using a suitable reporting format.

If a device command instruction is desired by the user, the user can then send another message from their mobile device 102a to the designated seek and find RF device 104. For example, but not limited to, a shut-down command, slow-down command, or the like can be sent to the seek and find RF device 104i residing in the automobile 114.

Other requesting party devices 102 may communicate with a designated seek and find RF device 104 using other types of communication systems. For example, the exemplary PC 102b is likely communicatively connected to the Internet 118 via a suitable service provider network 120, such as, but not limited to, an Internet service provider. If the exemplary PC 102b, or other electronic device, is directly communicatively coupled to the Internet 118, the PC 102b may communicate with a designated seek and find RF device 104 directly over the Internet 118.

Accordingly, when the user of the PC 102b wishes to receive information regarding the location of a designated seek and find RF device 104, the PC 102b communicates a suitable Internet or other wide area network formatted message with a location query onto the service provider network 120. Eventually, the message is communicated over the Internet 118 to wireless cell phone network 106. The message is then formatted into a suitable RF cell phone signal, and is then communicated to the designated seek and find RF device 104. Communication of the reply message with the location information therein is transmitted from the designated seek and find RF device 104 onto the wireless cell phone network 106, eventually through the Internet 118, and then onto the service provider network 120 for delivery to the PC 102b. If a device command instruction is desired, the user can then send another message from their PC 102b to the designated seek and find RF device 104.

Alternatively, or additionally, a requesting party device 102 may communicate with a designated seek and find RF device 104 using different types of communication systems. For example, the exemplary PC 102b may be communicatively connected to an e-mail system 122. An e-mail message with the location query therein (and/or the device command instruction) can be communicated over the e-mail system 122. The e-mail message may be received by the wireless cell phone network 106, and then sent to the designated seek and find RF device 104 using the RF cell phone signal. Alternatively, the e-mail message may be routed to the wireless cell phone network 106 via other intervening communication systems, such as, but not limited to, the exemplary Internet 118.

Requesting party devices 102 preferably include a display 124 thereon. Thus, the user may use a suitable user interface (e.g., a graphical user interface) to select the designated seek and find RF device 104. In some situations, access authorization is required before the message with the location query therein (and/or the device command instruction) is communicated to the designated seek and find RF device 104. Further, a particular user may be authorized to query the location of multiple seek and find RF devices 104. Also, a plurality of users may be authorized to query the location of a particular seek and find RF devices 104.

Figure 2:
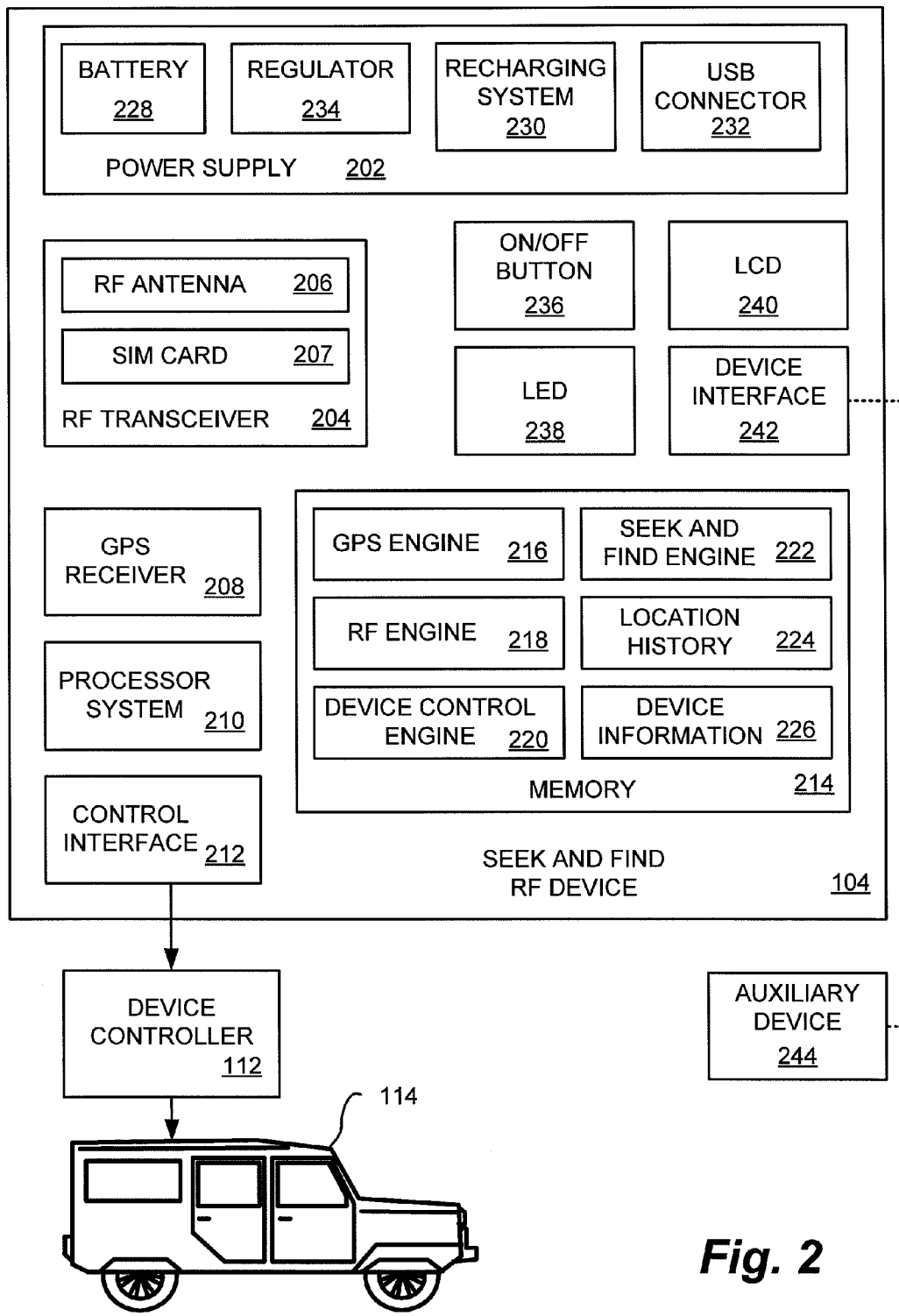
FIG. 2 is an exemplary block diagram illustrating an exemplary seek and find device.

FIG. 2 is an exemplary block diagram illustrating an exemplary seek and find device 104. The exemplary seek and find RF device 104 comprises a power supply 202, a RF transceiver 204 coupled to an RF antenna 206, a subscriber identity module (SIM) card 207, a GPS receiver 208, a processor system 210, a control interface 212, and a memory 214. The exemplary memory 214 includes regions for storing a GPS engine 216, an RF engine 218, a device control engine 220, a seek and find engine 222, a location history 224, and device information 226. Any suitable memory medium or memory device may be used for the memory 214 n various embodiments. Further, memory 214 is illustrated as a single memory unit or device. In alternative embodiments, memory 214 may be comprised of multiple memory portions, units, and/or devices. For example, but not limited to, a memory unit or device (not shown) may be included as a component of, and/or integrated into, of the processor system 210.

The power supply 202 preferably includes a battery 228 or the like. An exemplary embodiment has a 3.7V, 600 mAh Li-ion battery 228 that is rechargeable. Any suitable battery 228 may be used in various embodiments. In some embodiments, a battery recharging system 230 is included in the seek and find RF device 104. In an exemplary embodiment, the seek and find RF device 104 may be charged via a micro USB connector 232. An LTC4062 Li-ion battery allows the seek and find RF device 104 to be used with the battery recharging system 230 disconnected.

Preferably, power signal conditioning circuitry 234, such as one or more regulators or the like, is included in the power supply 102, or is coupled thereto. An exemplary embodiment includes two MIC5235 regulators (not shown) that regulate the battery voltage down to a selected operating voltage used by various components of the seek and find RF device 104, such as, but not limited to, 3.3V and 2.7V. In an exemplary embodiment, the regulators 234 are controlled by an 3V3_EN circuit from an ON/OFF circuit, button, switch or the like. The power supply 102 may be configured to connect directly to an emulation device, such as the regulators 234, for constant power. Thus, the seek and find RF device 104 may be configured to be recharged by another power source in an installation device, such as in a car, boat, motor bike, aircraft, or laptop computer.

In an exemplary embodiment, an On/OFF button 236 may operate as an "SOS" button. A controller (nKILL) circuit will turn the unit OFF. An exemplary ON/OFF button 236 is a LTC2950 circuit that has a micro power, wide input voltage range, push button ON/OFF controller. The ON/OFF button 236 contains a push button input with independently programmable ON and OFF debounce times that control the toggling of an open drain to enable output. The ON/OFF button 236 may also contain a simple microprocessor interface to allow for system housekeeping prior to power.

Some embodiments include one or more visual status indicating devices 238, such as a suitable lamp or light emitting diode (LED). For example, the seek and find RF device 104 has 4 LEDs 238 from the 1101F series. The LEDs 238 are switch on using BSS138, an N-Channel Logic Level Enhancement Mode Field Effect Transistor.

The GPS receiver 208 may be a Quad Band GSM/GPRS module. In an exemplary embodiment, the GPS receiver 208 is a type SE867-AGPS that is currently the smallest GPS in the world, and a first GPS standalone module featuring state-of-the-art GPS characteristics, with high quality and localization. The localization is preferably down to one meter.

Some embodiments may include a liquid crystal display (LCD) 240 in communication with the processor system 210. The LCD 240 may present information for diagnostics purposes, such as display of RF signal strength, battery power, and other information of interest. In an exemplary embodiment, a 1.35-inch Monochrome Square LCD (96×96 resolution) is included with features that deliver a display with 50% reflectance and a breakthrough 15 µW power consumption. Memory reflective LCDs are visible in a 0.5 lux environment without requiring a light source, and deliver high visibility in a variety of adverse conditions. The lightweight, thin display removes many design limitations for handheld and wrist-top applications.

The processing system 210, in an exemplary embodiment, is a low-power CMOS 8-bit microcontroller based on enhanced RISC architecture. By executing powerful instructions in a single clock cycle, the exemplary embodiment with a Tmega644 processing system 210 achieves throughputs approaching 1 MIPS per MHz allowing the system designer to optimize power consumption versus processing speed. Any suitable microcontroller device and/or system may be used in the various embodiments.

The RF antenna 206 is configured to receive the RF cell phone signal initiated by a requesting party device 102 from the wireless cell phone network 106, and is configured to transmit a reply RF cell phone signal with its location information therein to the wireless cell phone network 106. The RF transceiver 204 is configured to convert the detected RF cell phone signal into a communication that can be processed by processor system 210. The RF transceiver 204 is further configured to generate the reply signal that is communicated from the RF antenna 206. Any suitable RF transceiver, receiver, transmitter system or device may be used in the various embodiments.

The SIM card 207 uniquely identifies the seek and find RF device 104 and is used for management of the received and transmitted RF cell phone signals. In an exemplary embodiment, an electronic SIM card (eSIM) is used that is significantly smaller than conventional SIM cards (e.g., 40 millimeters by 80 millimeters). Any suitable SIM card may be used that is configured for communications on the wireless cell phone network 106.

The SIM card 207 is a communication service component of a Global System for Mobile Communications (GSM) mobile communication system, using standardized communications protocols that allow the exchange of short text messages (SMS) between the requesting party device 102 and the seek and find RF device 104. SMS text messaging is a very widely used data application. Thus, the location query generated by the requesting party device 102 may be a SMS text message or the like that is communicated to the designated seek and find RF device 104. The location information provided by the designated seek and find RF device 104 may be a SMS text message, or may be in a format such that when the location information is received by the requesting party devices 102, the location information can be processed and presented in the form of a SMS text message or the like. Similarly, device command instructions can be communicated using SMS messages or the like.

Embodiments may support any suitable SMS service, such as ANSI CDMA networks, Digital AMPS, satellite networks, and landline networks. Most SMS messages are mobile-to-mobile text messages, although the embodiments support other types of broadcast messaging as well. Embodiments may also be configured for operation with equivalents of the SIM card 207. An equivalent of a SIM card 207 operating in a Universal Mobile Telecommunications System (UMTS) is called the Universal Integrated Circuit Card (UICC). Another equivalent runs a Universal Subscriber Identity Module (USIM) application. Yet another equivalent may use a Removable User Identity Module (R-UIM) for operation in Code division multiple access (CDMA) based devices (e.g. CDMA2000). The UICC card is still colloquially designated a SIM card. Many CDMA-based standards do not include a removable SIM card, and the service is bound to a unique identifier contained in the handset itself. In alternative embodiments, the requesting party devices 102 and or the seek and find RF devices 104 may be configured under such standards. Thus, embodiments of the seek and find RF device 104 may be configured for operation on any wireless system anywhere in the world.

The control interface 212 is in communication with the processor system 210 and is configured to convert device command instructions into a command signal that is communicated to and understood by a device controller 112 in the installation device. For example, an OFF/ON device command signal may be configured to allow operation of, or disable operation of, the exemplary automobile 114. The control interface 212 could be configured to generate and transmit, for example, a +1 bit value signal or a high voltage signal to the device controller 112 to indicate that operation of the automobile 114 is permitted. The control interface 212 could be configured to generate and transmit, for example, a 0 bit value signal or a low voltage signal to indicate that operation of the automobile 114 is to be wholly or partially disabled. Thus, in response to receiving a device disable command from the requesting party device 102, the processor system 210 would instruct the control interface 212 to change its output from +1 to 0 (or from high to low voltage) so that the device controller 112 wholly or partially disables the automobile 114.

A device interface 242 may be included that is configured to couple to an auxiliary device 244. The device interface 242 and the auxiliary device 244 may be communicatively coupled using any suitable wired or wireless communication medium. Alternatively, the auxiliary device 244 may be communicatively coupled to the seek and find RF device 104 via the control interface 212 and/or the device controller 112 residing in the installation vehicle.

In various applications, the auxiliary device 244 may be a thermometer or a moisture sensor. Thus, temperature sensed by the thermometer, and/or moisture sensed by the moisture sensor, can be converted by the device interface 242 into information that is provided to the seek and find RF device 104. The information may be included with the location information that is returned to the requesting party device 102.

Other non-limiting examples of auxiliary devices 244 include a compass (to identify a current heading), an accelerometer (to indicate an abrupt velocity change, such as during a collision of the installation vehicle), and/or gyroscope (to indicate a change in direction). Thus motion and vibration may be sensed and communicated from the seek and find RF device 104. For example, a loss or structural support or a structure collapse may be detected. As another example, construction work may be detected, such as driving piles, demolition, drilling and/or excavation. An earthquake could be detected. Thus, dynamic monitoring can be performed by analyzing information detected by the auxiliary device 244.

In an exemplary embodiment, wherein the auxiliary device 244 is an accelerometer or other collision sensing device, detection of a collision of the installation vehicle causes the auxiliary device 244 to communicate a signal to the device interface 242. IN response to receiving the signal corresponding to the collision event, a device identifier uniquely associated with the requesting party device If the seek and find RF device 104 is attached to or carried by a human, activities such as walking, running, dancing, skipping may be identified. If the seek and find RF device 104 is coupled to a machine, stresses, vibrations due to traffic or wind gusts, concussion loads from internal or external explosions, and/or debris impacts may be sensed. Movement of the installation vehicle may be detected, such as when it is moving over pavement, bridges, or dirt. If the auxiliary device 244 is a pressure sensor, air blasts and weather changes may be detectable. If the auxiliary device 244 is a microphone, noise may be detectable. Accordingly, information from a particular auxiliary device 244 may be communicated from the designated seek and find RF device 104 back to the requesting party device 102.

In another embodiment, the seek and find RF device 104 may be communicatively coupled to a medical device that monitors condition of a patient and/or that delivers a medicine to the patient. For example, a drug delivery system and sugar level monitor system for a patient may respond to a location query transmitted to the seek and find RF device 104 from a remotely located requesting party device 102. The sugar levels of the patient may be thus communicated to the requesting party device 102 (along with the location of the patient). If needed, a device command could then be sent from the requesting party device 102 so that a dose of insulin or the like is administered to the patient. Such an application could be very desirable when the patient is a child or young adult who is likely partaking in activities where their parents may not be able to monitor their location and/or sugar levels.

In another embodiment, the seek and find RF device 104 may be attached to a pet. For example, if the pet escapes from its yard or enclosure, or if the pet is stolen, the pet's location can be readily determined. Further, if tracking is enabled, the travels of the pet while on the loose may be monitored.

The GPS engine 216 is configured to interface the processing system 210 with the GPS receiver 208. The GPS engine 216 is retrieved and executed by the processor system 210, or another processor system (not shown), to receive and interpret information from the GPS receiver 208. In some embodiments, the GPS receiver 208 provides the determined location information. In another embodiment, the GPS receiver 208 provides information corresponding to the detected satellite signals 108. Thus, the processor system 210 uses the GPS engine 216 to compute the location information based on the detected satellite signals 108.

Determined location information may be optionally saved into the location history 224. Thus, a historical record of movement of the seek and find RF device 104, and thus the installation device, can be maintained. For example, the user of the requesting party device 102 may be interested where their automobile has traveled over some specified or predefined period, such as the last 24 hour period. Thus, location information for that period can be retrieved from the location history 224 and communicated back to the user's requesting party device 102.

The RF engine 218 is configured to interface the processing system 210 with the RF transceiver 204. The RF engine 218 is retrieved and executed by the processor system 210, or another processor system (not shown), to receive and interpret the information in received RF cell phone signals. Further, the RF engine 218 is configured to generate a signal with the location information that is communicated from the seek and find RF device 104, via the wireless cell phone network 106, back to the requesting party device 102.

The device control engine 220 is configured to interface the processing system 210 with the device controller 112. The device control engine 220 is retrieved and executed by the processor system 210, or another processor system (not shown), to generate the device control instructions. Thus, the device control engine 220 logic can be configured to provide control of operation of any installation device since a suitable device command can be devised for any suitable device controller.

The seek and find engine 222 is configured to interface the processing system 210 with the requesting party device 102. The seek and find engine 222 is retrieved and executed by the processor system 210, or another processor system (not shown), so that the request for location information is recognized, and so that an appropriate response with the location information is generated and communicated back to the requesting party device 102. Also, the seek and find engine 222 is configured to interpret device command instructions received from the requesting party device 102.

Information of interest pertaining to the seek and find RF device 104 may be stored in the device information 226. For example, but not limited to, a list of authorized requesting party devices 102 may be maintained. Thus, if a requesting party device 102 that is not on the authorized list transmits a request for location information and/or a device command instruction to the seek and find RF device 104, the location information request and/or device command may be ignored. Some embodiments may be configured to transmit an alarm or other message back to a predefined requesting party device 102 when unauthorized communications are received, and/or if the seek and find RF device 104 is tampered with.

Figure 3:
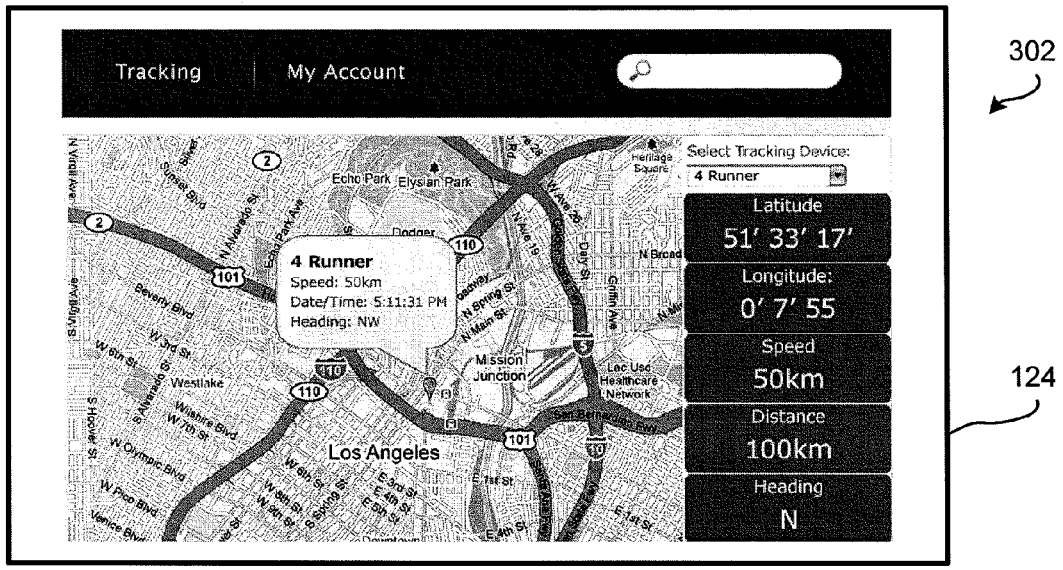
FIGS. 3 and 4 illustrate hypothetical textual and/or graphical information presented on a display of the requesting party device to the user in the form of a map.
Figure 4:
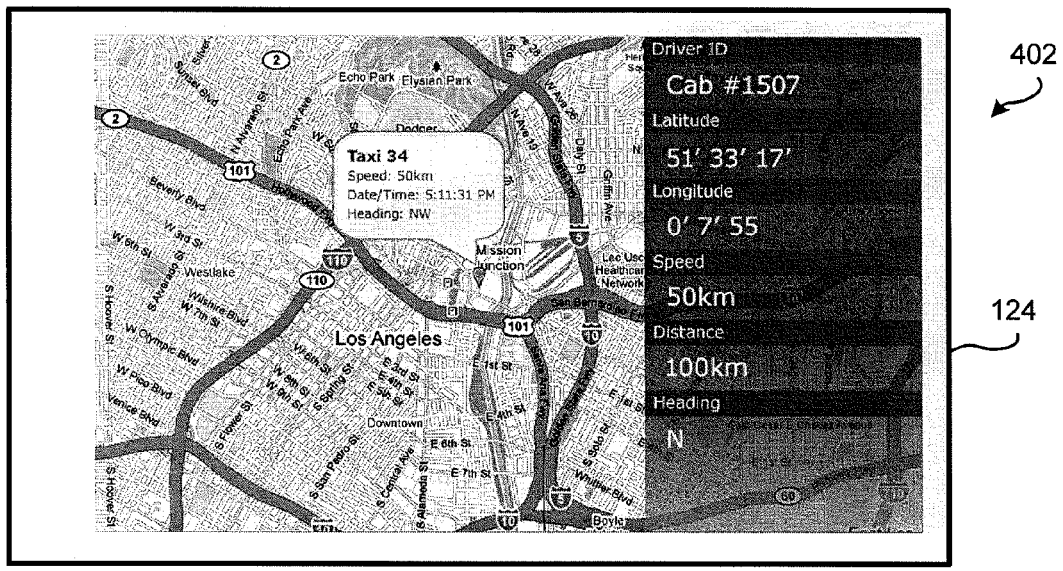

In response to receiving the location information provided by the seek and find RF device 104, the requesting party device 102 can then prepare an information report describing the location of the seek and find RF device 104, and thus the installation device, to a user. FIG. 3 illustrates hypothetical textual and/or graphical information presented on a display 124 of the requesting party device 102 installed in the vehicle 114 (a Toyota 4-Runner) to the user in the form of a map 302. FIG. 4 illustrates hypothetical textual and/or graphical information pertaining location information for a taxi (number 34) in the form of a map 402. Thus, both a private application and a commercial application of embodiments of the seek and find system 100 are demonstrated.

The maps 302, 402 integrate the present location of the seek and find RF device 104 with a mapping system. Any suitable mapping system may be used. For example, if the requesting party device 102 is a mobile device with its own GPS system therein, the location information of the seek and find RF device 104 can be integrated with the GPS map display system. In other embodiments, a memory residing in the requesting party device 102 includes a map database and a map graphics engine. The received location information is used to identify a relevant area represented in the map database. That portion of the map data is retrieved, and the map graphics engine incorporates the received location information and the map information to present a map on the display 124.

In some embodiments, the location information provided by the seek and find RF device 104 includes other supplemental information of interest. For example, if the seek and find RF device 104 includes a compass, the current heading may be graphically and/or textually indicated. If an accelerometer and/or gyroscope is included in the seek and find RF device 104, then a current speed may be indicated. If location history information is provided, the maps 302, 402 may indicate a path of travel that the installation device has taken and/or a distance that the installation device has traveled. Some embodiments may display a current time and/or date that the location information was collected at. For example, the vehicle 114 may be in an underground parking garage where the GPS satellite signal 108 cannot be received. In response to a request for location information, the seek and find RF device 104 can send its last known location along with a corresponding time and/or date when the last known location was determined.

In some embodiments, the location information provided by the seek and find RF device 104 includes other supplemental information of interest that has been retrieved from the device information 226 residing in the memory 214. For example, in FIG. 4, the identification number of the taxi (cab #1507) is displayed on the map 402.

Embodiments of the seek and find RF device 104 may be used for other purposes. For example, an embodiment may be used for personal tracking of a person or pet. The seek and find RF device 104 may be installed in a device carried by the person or pet, such as a watch or collar, respectively.

Embodiments of the seek and find RF device 104 may be installed in or coupled to any suitable object (referred to herein as an installation device). Non-limiting examples of an installation device include a car, a boat, a motor bike, an aircraft, luggage, or a laptop computer. Thus, theft of personal property can be deterred or prevented. If the property is stolen or lost, the property can be recovered once the location information from the seek and find RF device 104 is received. If the property is stolen, such as a stolen car, the car may be stopped or its speed may be limited to facility recovery by the authorities and apprehension of the thief.

Embodiments of the seek and find RF device 104 may be used for commercial purposes, such as vehicle fleet and logistic management, aviation monitoring of luggage, and for identifying particular objects for product inventory management. Embodiments may be used in medical applications, such as for patient tracking, security and integration. Insurance companies may use the seek and find RF device 104 to monitor location of valuable insured objects. As another non-limiting example, the seek and find system 100 may cooperatively operate with a refrigeration unit in a cargo container. Temperature information provided by a thermometer coupled to the device interface 242 may be included with the location information, and adjustments to the thermostat of the refrigeration unit may be made via the control interface 212 in the seek and find RF device 104.

Embodiments of the seek and find system 100 may be configured to transfer information from the requesting party device 102 to the installation device. For example, if the seek and find RF device 104 is integrated with or into a laptop, the established RF connection between the seek and find RF device 104 and the requesting party device 102 can be used for uploading and/or downloading data or software.

In some embodiments, the location information from a plurality of designated seek and find RF devices 104. For example, an insurance company may wish to ascertain the extent of damage caused by some natural event. Thus, a requesting party device 102 operated by the insurance company can send location queries to many designated seek and find RF devices 104 that have one or more auxiliary devices 244. Information from the auxiliary devices 244 may then be returned to the requesting party device 102.

Figure 5:
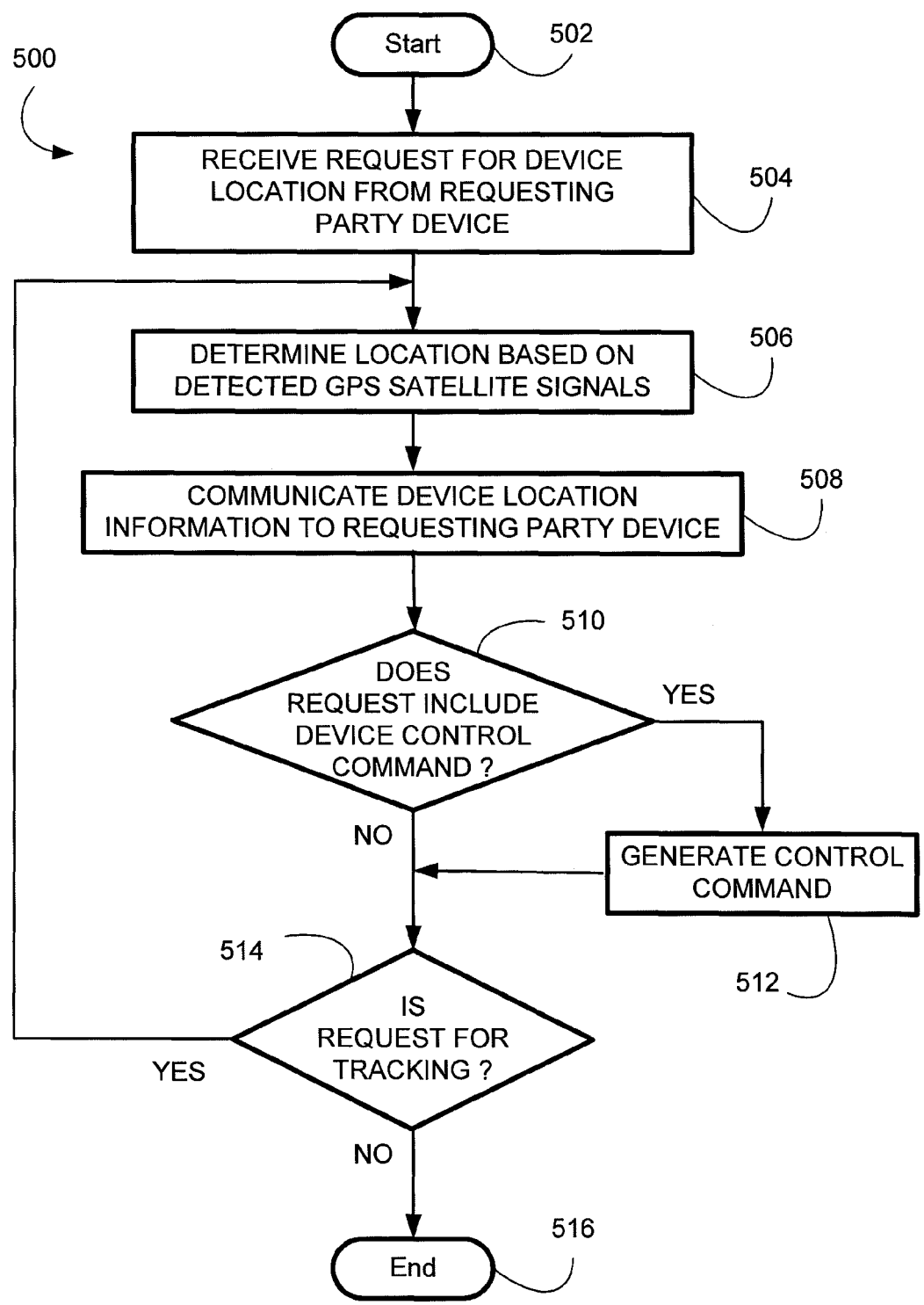
FIG. 5 is an exemplary flow chart illustrating an exemplary process of using a seek and find device.

FIG. 5 is an exemplary flowchart 500 illustrating the operation of an exemplary embodiment of the seek and find system 100. The flowchart 500 shows the architecture, functionality, and operation of an exemplary implementation of the software for implementing the seek and find system 100. In this regard, each block may represent a module, segment, or portion of code, which comprises one or more executable instructions for implementing the specified logical function(s). It should also be noted that in some alternative implementations, the functions noted in the blocks may occur out of the order noted in FIG. 5, may include additional functions, and/or may omit some functions. For example, two blocks shown in succession in FIG. 5 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

With respect to FIG. 5, the process starts at block 502, for example, in response to the starting or powering up of the seek and find RF device 104 when it is installed, or when the installation device is powered. At block 504, a request for device location is received from a requesting party device 102. At block 506, the device location of the seek and find RF device 104 is determined based on the detected GPS satellite signals 108. At block 508, the location of the seek and find RF device 104 is communicated to the requesting party device 102.

At block 510, a determination is made whether the request includes a device control command. If yes, a control command is generated and transmitted to the installation device (via the control interface 212) at block 512. If not, the process continues to block 514 where a determination is made whether a request for tracking has been made. If not, the process ends at block 516. If yes, the process keep tracking current location of the seek and find RF device 104. The tracking may be continued for a predetermined period, for a predetermined distance, and/or until a message requesting termination of the tracking is received from the requesting party device 102. The determined location information may be optionally stored in the location history 224 and then communicated to the requesting party device 102.

In some embodiments, the control interface 212 and one or more the device controllers 112 may be integrated together. Similarly, the device interface 242 and one or more auxiliary devices 244 may be integrated together. Such integrated devices may be coupled to a designated seek and find RF device 104, or may be included as a component of the seek and find RF device 104.

Appendices I-III contain descriptions of a detailed exemplary embodiment of a seek and find system, such as the seek and find system 100. Appendix I describes an example embodiment. Appendix II describes exemplary functionality of an example embodiment. Appendix III are photographs of an example embodiment. Appendices I-III are incorporated by reference herein in their entirety.

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 14/205,120, entitled "SEEK AND FIND LOCATION METHOD, SYSTEM AND APPARATUS," filed Mar. 11, 2014, U.S. application Ser. No. 13/065,337, entitled "SEEK AND FIND LOCATION METHOD, SYSTEM AND APPARATUS," filed Mar. 18, 2011 and U.S. Provisional Patent Application No. 61/315,803, entitled "SEEK AND FIND LOCATION METHOD, SYSTEM AND APPARATUS," filed Mar. 19, 2010, are incorporated herein by reference, in their entireties.

From the foregoing it will be appreciated that, although specific embodiments have been described herein for purposes of illustration, various modifications may be made without deviating from the spirit and scope of the present disclosure. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method performed in a seek and find radio frequency (RF) device for locating the seek and find RF device, wherein the seek and find RF device stores a list of device identifiers that identify at least one authorized requesting party device that is authorized to receive location information that defines a location for the seek and find RF device, comprising:
   receiving a first RF cell phone signal from the requesting party device over a wireless cellular network, wherein the first RF cell phone signal includes at least a device identifier that identifies the requesting party device and a location query requesting the location information of the seek and find RF device, wherein the location query is directed to the seek and find RF device using a mobile device identifier;
   receiving at least three GPS satellite signals;
   determining a location of the seek and find RF device based upon the at least three GPS satellite signals;
   comparing the device identifier of the requesting party device with the list of device identifiers that identify the at least one authorized requesting party device;
   determining whether the requesting party device is one of the authorized requesting party device or an unauthorized requesting party device based on the comparison of the device identifier of the requesting party device with the list of device identifiers that identify the at least one authorized requesting party device;
   where in response to determining that the requesting party device is the authorized requesting party device, the method further comprises:
      transmitting a second RF cell phone signal, wherein the second RF cell phone signal includes the determined location, and wherein the second RF cell phone signal is directed to the requesting party device using a device identifier uniquely associated with the requesting party device; and
   where in response to determining that the requesting party device is the unauthorized requesting party device, the method further comprises:
      ignoring the request for location information from the unauthorized requesting party device; and
      transmitting the second RF cell phone signal to the authorized requesting party device, wherein the second RF cell phone signal indicates that the seek and find RF device received the request for location information from the unauthorized requesting party device.

2. The method of claim 1 wherein the device identifier of the requesting party device is a second mobile device identifier (i.e.: cell phone number), and further comprising:
   communicating the first RF cell phone signal and the second RF cell phone signal over a wireless cell phone system used by the requesting party device, wherein the second RF cell phone signal is directed to the requesting party device based upon the second mobile device identifier.

3. The method of claim 1, wherein the device identifier of the requesting party device is an internet protocol (IP) address, and further comprising:
   communicating the first RF cell phone signal and the second RF cell phone signal over the Internet used by the requesting party device,
   wherein the second RF cell phone signal is directed to the requesting party device based upon the IP address.

4. The method of claim 1, wherein the device identifier of the requesting party device is an e-mail address, and further comprising:
   communicating the first RF cell phone signal and the second RF cell phone signal over an e-mail system used by the requesting party device,
   wherein the second RF cell phone signal is directed to the requesting party device based upon the e-mail address.

5. The method of claim 1, further comprising:
   receiving a third RF cell phone signal from the requesting party device, wherein the third RF cell phone signal includes at least a device command instruction configured to control operation of a device.

6. The method of claim 5, wherein the controlled device is an automobile, and wherein the device command instruction is configured to disable operation of an engine in the automobile, the method further comprising:
   communicating a control signal to a device controller in the automobile, wherein the device controller in the automobile is configured to disable the engine in response to receiving the control signal.

7. The method of claim 5, wherein the controlled device is a medical device drug delivery system, and wherein the device command instruction is configured to operate the medical device drug delivery system to deliver medicine to a patient, the method further comprising:
   communicating a control signal to a device controller in the medical device, wherein the device controller in the medical device is configured to deliver the medicine to the patient.

8. The method of claim 5, wherein the third RF cell phone signal is different from the first RF cell phone signal, and wherein the third RF cell phone signal is received after the first RF cell phone signal.

9. The method of claim 1, wherein the location information in the second RF cell phone signal is communicated to the requesting party cellular phone device in a short text message.

10. The method of claim 1, the method further comprises:
   transmitting a third RF cell phone signal to the authorized requesting party device that indicates that the seek and find RF device is being tampered with.

11. A system, comprising:
   a requesting party device configured to communicate a location query directed to a remote electronic device that is identified by a mobile device identifier, wherein the location query is communicated to the remote electronic device using a first radio frequency (RF) cell phone signal; and
   the remote electronic device, wherein the remote electronic device comprises:
      a GPS receiver configured to receive at least three GPS satellite signals;

a processor system configured to determine a location of the remote electronic device based upon the at least three GPS satellite signals;
a memory that stores a list of device identifiers that identify at least one authorized requesting party device; and
a RF transceiver configured to receive the first RF cell phone signal from the requesting party device that includes a device identifier that identifies the requesting party device and a request for location information that defines a location for the remote electronic device, and further configured to transmit a second RF cell phone signal,
wherein the processor system is configured to:
compare the device identifier of the requesting party device with the list of device identifiers that identify at least one authorized requesting party device;
determine whether the requesting party device is one of the authorized requesting party device or an unauthorized requesting party device based on the comparison of the device identifier of the requesting party device with the list of device identifiers that identify the at least one authorized requesting party device;
generate the second RF cell phone signal that is directed to the requesting party device when the requesting party device is determined to be the at least one authorized requesting party device, wherein the second RF cell phone signal includes the determined location of the remote electronic device; and
generate the second RF cell phone signal that is directed to the at least one authorized requesting party device when the requesting party device is determined to be the unauthorized requesting party device, wherein the second RF cell phone signal indicates that the remote electronic device received the request for location information from the unauthorized requesting party device, and wherein the request for location information is not provided to the unauthorized requesting party device.

12. The system of claim 11, wherein the device identifier of the requesting party device is an e-mail address.

13. The system of claim 11, further comprising:
a control interface communicatively coupled to the processor system and to a device controller that controls operation of a controlled device,
wherein the RF transceiver is configured to receive a third RF cell phone signal from the requesting party device that includes at least a device command instruction configured to control operation of the controlled device, and
wherein the processor system is further configured to generate a command signal that corresponds to the device command instruction received from the requesting party device; and
wherein the command signal generated by the processor system is communicated from the control interface to the device controller to control operation of the controlled device in accordance with the device command instruction received from the requesting party device.

14. The system of claim 13, wherein the controlled device is an automobile, and wherein the device command instruction is configured to disable operation of an engine in the automobile.

15. The system of claim 13, wherein the controlled device is a medical device drug delivery system, and wherein the device command instruction is configured to operate the medical device drug delivery system to deliver medicine to a patient.

16. The system of claim 11, wherein the processor system is further configured to:
generate a third RF cell phone signal that is transmitted to the authorized requesting party device that indicates that the remote electronic device is being tampered with.

17. A seek and find RF device that is attachable to or coupled to one of an auxiliary device, a human or a pet, comprising:
a GPS receiver configured to receive at least three GPS satellite signals;
a processor system configured to determine a location of the seek and find RF device based upon the at least three GPS satellite signals;
a memory that stores a list of device identifiers that identify at least one authorized requesting party device; and
a RF transceiver configured to receive the first RF cell phone signal from a requesting party device that includes a device identifier that identifies the requesting party device and a request for location information that defines a location for the seek and find RF device, and further configured to transmit a second RF cell phone signal,
wherein the processor system is configured to:
compare the device identifier of the requesting party device with the list of device identifiers that identify at least one authorized requesting party device;
determine whether the requesting party device is one of the authorized requesting party device or an unauthorized requesting party device based on the comparison of the device identifier of the requesting party device with the list of device identifiers that identify the at least one authorized requesting party device;
generate the second RF cell phone signal that is directed to the requesting party device when the requesting party device is determined to be the at least one authorized requesting party device, wherein the second RF cell phone signal includes the determined location of the seek and find RF device; and
generate the second RF cell phone signal that is directed to the at least one authorized requesting party device when the requesting party device is determined to be the unauthorized requesting party device, wherein the second RF cell phone signal indicates that the seek and find RF device received the request for location information from the unauthorized requesting party device, and wherein the request for location information is not provided to the unauthorized requesting party device.

18. The seek and find RF device of claim 17, further comprising:
a control interface communicatively coupled to the processor system and to a device controller that controls operation of a controlled device,
wherein the RF transceiver is configured to receive a third RF cell phone signal from the requesting party device that includes at least a device command instruction configured to control operation of the controlled device, and wherein the processor system is further configured to generate a command signal that corresponds to the device command instruction received from the requesting party device; and wherein the command signal generated by the processor system is communicated from the control interface to the device controller to control operation of the controlled device in accordance with the device command instruction received from the requesting party device.

19. The seek and find RF device of claim 17, wherein the processor system is further configured to:

generate a third RF cell phone signal that is transmitted to the authorized requesting party device that indicates that the seek and find RF device is being tampered with.

* * * * *

UNITED STATES PATENT AND TRADEMARK OFFICE
CERTIFICATE OF CORRECTION

PATENT NO. : 9,451,407 B2
APPLICATION NO. : 14/748055
DATED : September 20, 2016
INVENTOR(S) : Frode van der Laak et al.

It is certified that error appears in the above-identified patent and that said Letters Patent is hereby corrected as shown below:

In the Claims

In Column 11, Line 45 (Claim 1), "where in" should be -wherein-.

In Column 11, Line 54 (Claim 1), "where in" should be -wherein-.

In Column 11, Line 67 (Claim 2), the first occurrence of ":" should be a -,-.

Signed and Sealed this
Eleventh Day of February, 2020

Andrei Iancu
*Director of the United States Patent and Trademark Office*